June 19, 1934.   W. J. PEARMAIN   1,963,277
CLUTCH
Filed Sept. 5, 1930   2 Sheets-Sheet 1

Inventor
William J. Pearmain
By Rector, Hibben, Davis & Macauley Attys.

June 19, 1934.    W. J. PEARMAIN    1,963,277
CLUTCH
Filed Sept. 5, 1930    2 Sheets-Sheet 2
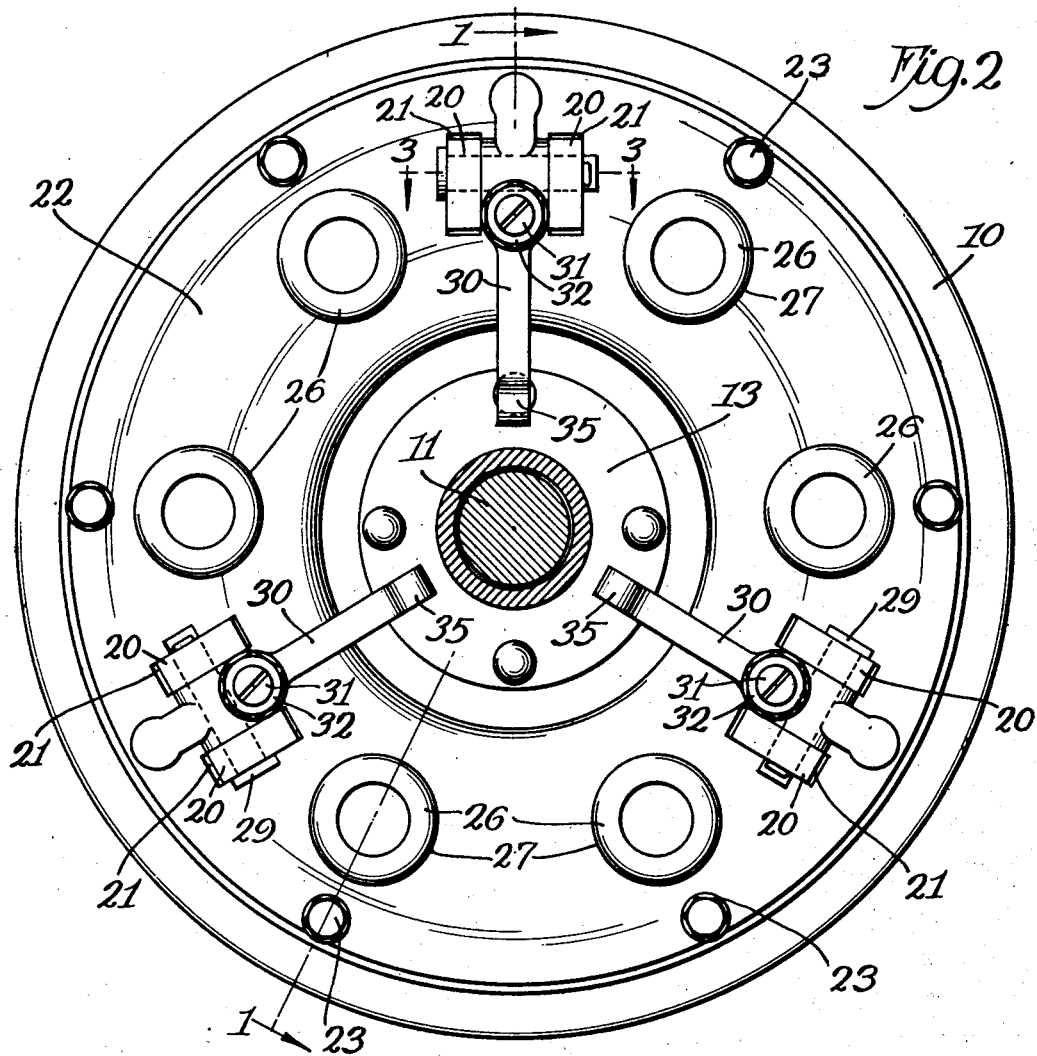
Fig. 2
Fig. 3
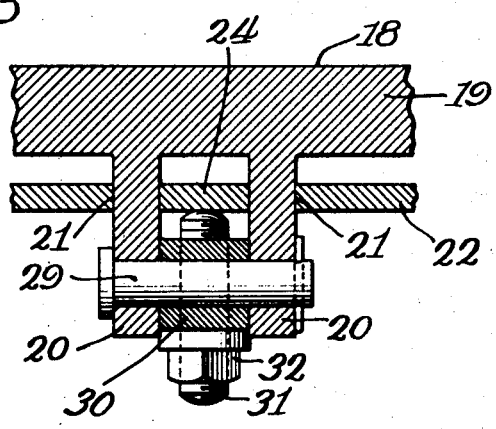
Inventor
William J. Pearmain
By Rector, Hibben, Davis & Macauley
Attys.

Patented June 19, 1934

1,963,277

UNITED STATES PATENT OFFICE 1,963,277

CLUTCH

William J. Pearmain, Racine, Wis., assignor to Twin Disc Clutch Company, Racine, Wis., a corporation of Wisconsin Application September 5, 1930, Serial No. 479,857

10 Claims. (Cl. 192—68)

My invention relates to clutches and is directed more particularly to a clutch in which a transmission of power is effected between rotary parts through mechanism which is normally in driving engagement.

One object of my invention is to devise a clutch in which driving engagement between the members which grip the clutch plate is effected by a novel construction which provides for a better distribution of the stresses operating, relative to existing constructions, with a consequent improvement in the strength characteristic of the clutch and in allied features of design.

A further object is to provide a clutch of the character described in which the area of driving engagement between the gripping members is substantially increased and is in fact doubled with a resulting decrease in the extent of localized strain on the clutch parts.

A further object is the provision of a clutch in which means are employed to prevent rattle of the clutch levers and in which the adjusting screw for each lever is located relatively close to the lever axis with a consequent shortening of the lever length and avoidance of any tendency to spring.

A further object is the devising of a clutch which is arranged for easy and accessible adjustment as the clutch facings wear, and which is further characterized by a simplicity of design that is reflected in low manufacturing and assembling costs.

Other objects will become more apparent from the following specification, reference being had to the accompanying drawings, and the novel means by which said objects are effectuated will be definitely pointed out in the claims.

In the drawings:

Fig. 2 is a section along the line 2—2 in Fig. 1 looking in the direction of the arrows.

Fig. 3 is an enlarged section along the line 3—3 in Fig. 2, looking in the direction of the arrows and showing the driving relation between the gripping members of the clutch.

Figure 1:
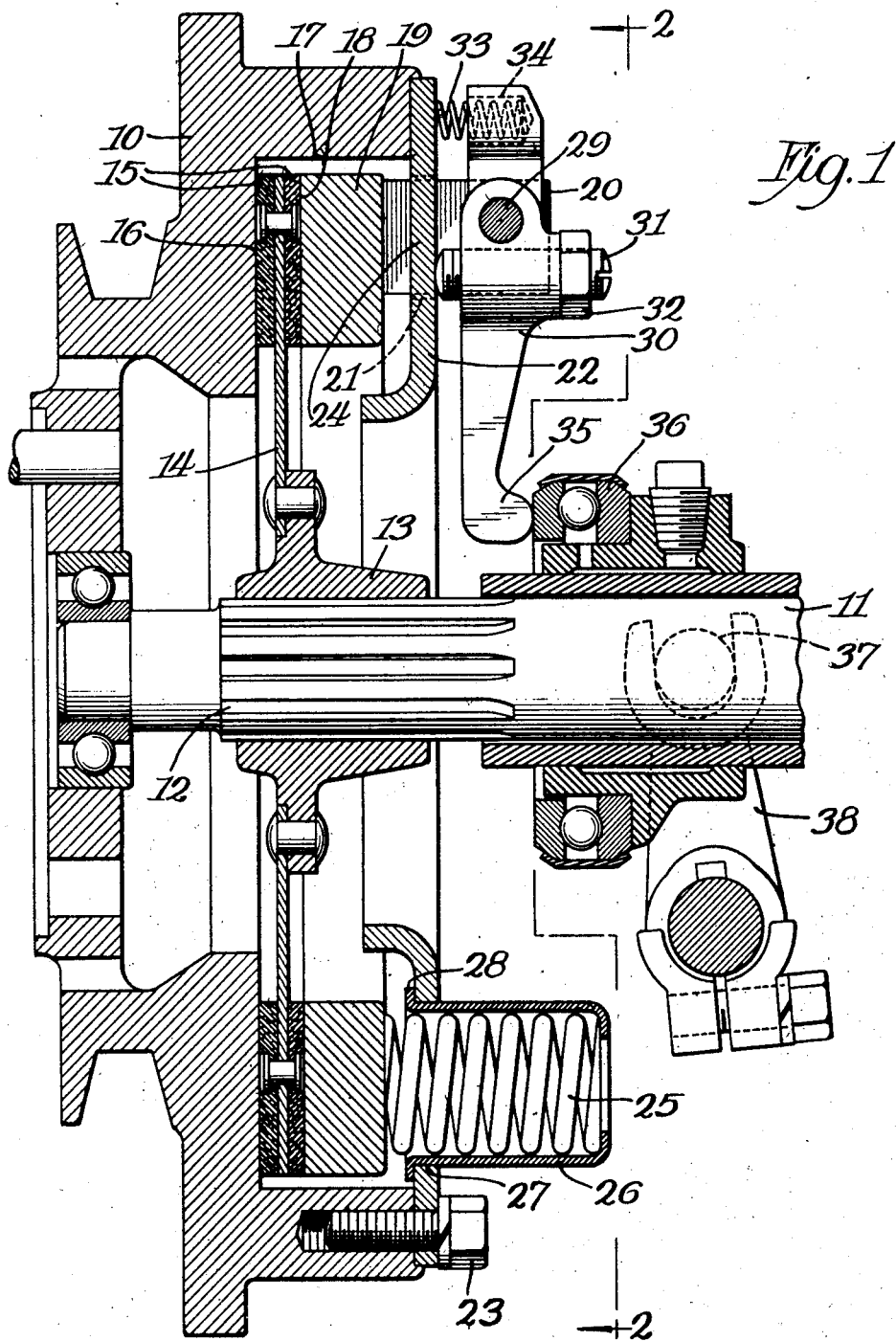
Figure 1 is a sectional elevation of my improved clutch, taken generally along the line 1—1 in Fig. 2 and looking in the direction of the arrows.

Referring to Fig. 1, the numerals 10 and 11 designate, respectively, the flywheel and a shaft which for purpose of illustration may be regarded generally as the driving and driven members. One end of the shaft 11 is journaled in the flywheel 10 and is splined as at 12 to receive a hub 13, thus compelling said hub to partake of the rotary motion of said shaft, but permitting a slight axial movement therealong. A clutch plate 14 is secured to the hub 13 and has attached thereto on opposite sides adjacent the periphery thereof facings of frictional material 15. These facings are arranged to engage, respectively, with a face 16 which is formed by counterboring one side of the flywheel 10 to provide a recess 17 and also with a face 18 formed on a floating plate 19 which is also received within the recess 17, said flywheel and said plate therefor constituting the gripping members of the clutch.

The floating plate 19 is carried by, and driving engagement is had with, the flywheel 10 through the medium of a plurality of circumferentially disposed lugs 20, arranged in spaced pairs adjacent the periphery of said plate which extend through similarly disposed slots 21 provided in a support plate 22 which is secured to the flywheel 10 by cap screws 23 in a manner to partially enclose the recess 17, as shown clearly in Fig. 1. As shown in Fig. 3, the spacing of each pair of the slots 21 defines a bridge portion 24 therebetween which is utilized for a purpose hereinafter explained. As a means of normally pressing the floating plate into gripping engagement with the facing 15 against the flywheel 10, a plurality of springs 25 is employed, one end of each spring abutting against a side of said plate and the other end against the bottom of a housing 26 which projects through a hole 27 provided in the support plate 22, the open end of said housing having an annular shoulder 28 formed thereon which seats against the inner side of the support plate 22 under the action of said spring. As noted in Fig. 2, the springs 25 are equi-spaced at the same radial distances around the floating plate 19, or may be disposed as convenient.

Extending between each pair of lugs 20 is a pin 29 and pivotally mounted thereon is a lever 30, said lever being radially disposed with reference to the shaft 11 and extending outwardly and inwardly from the pin 29. Any desired initial position of the lever 30 may be effected through an adjusting screw 31 which passes through said lever and cooperates with the adjacent portion 24 between the slots 21, the adjustment of said screw being locked by a nut 32. In order to maintain contact of the screw 31 with the portion 24 and to prevent rattle of the levers during the rotation of the clutch, the outer end of each lever 30 carries a coil spring 33, one end of which is received within a pocket 34 formed on said lever and the other end of which abuts against the adjacent face of the support plate 22, said springs being slightly compressed when the clutch springs 25 return the floating plate 19 to normal gripping position. The inner extremities of the clutch levers 30 are formed as noses 35 which cooperate with a collar 36 that is slidably mounted on the shaft 11. Said collar may be provided with laterally extending pins 37 for engagement with a suitable lever 38 that may be actuated in any desired manner.

As shown in Fig. 1, the various members of the clutch are in driving position, owing to the pressure furnished by the springs 25 which grip the clutch plate 14 between the flywheel 10 and the floating plate 19. To release the clutch and thus interrupt the flow of power from the flywheel 10 to the shaft 11, the collar 36 is moved along said shaft toward the left, as viewed in Fig. 1, thus causing a similar movement of the noses 35 on the levers 30. For each lever, the fulcrum of the movement which then follows will be exercised by the end of the adjusting screw 31 against the bridge portion 24, thus causing a movement of the pin 29 away from said face with a resulting carriage of the floating plate 19 in the same direction to release the pressure on the clutch plate 14. As the clutch facings 15 wear, readjustment is automatically effected by means of the springs 25 and accompanying adjustments of the clutch levers 30 may be effected through the screws 31.

The foregoing type of clutch structure is characterized by simplicity of design, ease of assembly and adjustment, and ready accessibility for repair. The provision of securing driving engagement between the gripping members of the clutch, that is, between the flywheel 10 and the floating plate 19, by means of the pairs of lug extensions 20 which are formed integrally on said plate substantially doubles the area of driving contact and materially lessens the severity of localized stress at these points. Moreover, the bridge portion 24 of support plate 22 is conveniently placed for engagement with the ends of the adjusting screws 31, which, in addition, function as the fulcrums of the levers 30.

While I have shown one set of elements and combinations thereof for effectuating my improved clutch, it will be understood that the same is intended for purpose of illustration only and in nowise to restrict my device to the exact forms and structures shown, for many changes may be made therein without departing from the spirit of my invention.

I claim:

1. In a clutch, the combination of a friction plate for attachment to a rotary part, a gripping member connectible to a second rotary part and located on one side of said plate, said member including a plurality of circumferentially disposed slots arranged in spaced pairs, a second gripping member disposed on the opposite side of said plate and spring actuated to press said plate against said first member, means for securing driving engagement between said members comprising a plurality of lugs extending from said second member through said slots, levers pivotally mounted on said lugs and fulcrumed on the portions of said first member between said slots, and means for actuating said levers to retract said second member from gripping position.

2. In a clutch, the combination of a friction plate for attachment to a rotary part, a gripping member connectible to a second rotary part and located on one side of said plate, said member including a plurality of circumferentially disposed slots arranged in spaced pairs, a second gripping member disposed on the opposite side of said plate and spring actuated to press said plate against said first member, means for securing driving engagement between said members comprising a plurality of lugs extending from said second member through said slots, levers pivotally mounted on and between said lugs and fulcrumed on the portions of said first member between said slots, and means for actuating said levers to retract said second member from gripping position.

3. In a clutch, the combination of a friction plate for attachment to a rotary part, a gripping member connectible to a second rotary part and located on one side of said plate, said member including a plurality of circumferentially disposed slots arranged in spaced pairs, a second gripping member disposed on the opposite side of said plate and spring actuated to press said plate against said first member, means for securing driving engagement between said members comprising a plurality of lugs extending from said second member through said slots, levers pivotally mounted on said lugs, a position adjusting screw passing through each of said levers to coact with the portions of said first member between said slots, and means for actuating said levers to retract said second member from gripping position, the retracting movement of said levers being fulcrumed on the ends of said screws against said portions.

4. In a clutch, the combination of a friction plate for attachment to a rotary part, a gripping member connectible to a second rotary part and located on one side of said plate, said member including a plurality of circumferentially disposed slots arranged in spaced pairs, a second gripping member disposed on the opposite side of said plate and spring actuated to press said plate against said first member, means for securing driving engagement between said members comprising a plurality of lugs extending from said second member through said slots, levers pivotally mounted on said lugs, a position adjusting screw passing through each of said levers to coact with the portions of said first member between said slots, means for actuating said levers to retract said second member from gripping position, the retracting movement of said levers being fulcrumed on the ends of said screws against said portions, and springs interposed between said levers and first member to maintain the ends of said screws against said portions.

5. In a clutch, the combination of a flywheel including a plurality of circumferentially disposed slots arranged in spaced pairs, a spring actuated floating plate having a plurality of lugs extending through said slots to thereby carry said plate on said flywheel and effect a driving engagement therebetween, a shaft, a friction plate mounted on said shaft and gripped between said flywheel and plate, levers pivotally connected to said lugs, a position adjusting screw passing through each of said levers for coacting with the portion of said flywheel between said slots, and means on said shaft for actuating said levers to release said plate, the releasing movement of said levers being fulcrumed on the ends of said screws against said portions.

6. In a clutch, the combination of a friction plate for attachment to a rotary part, a gripping member connectible to a second rotary part and located on one side of said plate, said member including a plurality of circumferentially disposed slots arranged in spaced pairs, a second gripping member disposed on the opposite side of said plate and spring actuated to press said plate against said first member, means for securing driving engagement between said members comprising a plurality of lugs extending from said second member through said slots, levers pivotally mounted on said lugs, position adjusting screws for said levers adapted to coact with the portions of said first member between said slots, and means for actuating said levers to retract said member from gripping position, the retracting movement of said levers being fulcrumed on said screws acting against said portions.

7. In a clutch, the combination of a flywheel constituting one rotary part and bored inwardly from one side thereof to define a gripping face, a support plate including a plurality of circumferentially disposed slots arranged in spaced pairs secured to said flywheel and bridged across said face, a friction plate attachable to a second rotary part and disposed within said bore in driving relation to said face, a floating plate located in said bore on the opposite side of said friction plate from said flywheel, integral driving extensions on said floating plate projecting through the slots on said support plate, spring means for moving said floating plate to grip said friction plate against said face, levers pivotally mounted on said extensions and fulcrumed on the portions of said cover plate between said extensions, and means for actuating said levers.

8. In a clutch, the combination of a flywheel constituting one rotary part and bored inwardly from one side thereof to define a gripping face, a support plate including a plurality of circumferentially disposed slots arranged in spaced pairs secured to said flywheel and bridged across said face, a friction plate attachable to a second rotary part and disposed within said bore in driving relation to said face, a floating plate located within said bore on the opposite side of said friction plate from said flywheel, integral driving extensions on said floating plate projecting through the slots on said support plate, springs for moving said floating plate to grip said friction plate against said face, a lever pivotally mounted between each pair of said extensions, a position adjusting screw mounted on each of said levers for coacting with the portions of said support plate between said slots, and means for actuating said levers to retract said floating plate from gripping position, the retracting movement of said levers being fulcrumed on the ends of said screws against said portions.

9. In a clutch, the combination of a friction plate for attachment to a rotary part, a gripping member connectible to a second rotary part and located on one side of said plate, said member including a plurality of circumferentially disposed slots arranged in spaced pairs, a second gripping member disposed on the opposite side of said plate and spring actuated to press said plate against said first member, means engageable with said slots for securing a driving engagement between said members, levers pivotally mounted on said means, a position adjusting screw passing through each of said levers to coact with the portions of said first member between said slots, means for actuating said levers to retract said second member from gripping position, the retracting movement of said levers being fulcrumed on the ends of said screws against said portions, and springs interposed between said levers and first member to maintain the ends of said screws against said portions.

10. In a clutch, the combination of a flywheel constituting one rotary part and bored inwardly from one side thereof to define a gripping face, a support plate including a plurality of circumferentially disposed slots arranged in spaced pairs secured to said flywheel and bridged across said face, a friction plate attachable to a second rotary part and disposed within said bore in driving relation to said face, a floating plate located within said bore on the opposite side of said friction plate from said flywheel, integral driving extensions on said floating plate projecting through the slots on said support plate, springs for moving said floating plate to grip said friction plate against said face, a lever pivotally mounted between each pair of said extensions, fulcrum means mounted on each of said levers for co-action with the portions of said support plate between said slots, and means for actuating said levers to retract said floating plate from gripping position.

WILLIAM J. PEARMAIN.